United States Patent
Zubas et al.

(10) Patent No.: US 8,694,245 B2
(45) Date of Patent: Apr. 8, 2014

(54) METHODS, DEVICES, AND COMPUTER PROGRAM PRODUCTS FOR EXCHANGING INTERACTIVE MAP INFORMATION

(75) Inventors: Michael Zubas, Marietta, GA (US); Mark Causey, Tucker, GA (US); Adrianne Luu, Roswell, GA (US)

(73) Assignee: AT&T Mobility II LLC, Atlanta, GA (US)

(*) Notice: Subject to any disclaimer, the term of this patent is extended or adjusted under 35 U.S.C. 154(b) by 653 days.

(21) Appl. No.: 12/958,598

(22) Filed: Dec. 2, 2010

(65) Prior Publication Data
US 2012/0143498 A1 Jun. 7, 2012

(51) Int. Cl.
*G06F 15/16* (2006.01)

(52) U.S. Cl.
USPC .......................................................... 701/426

(58) Field of Classification Search
USPC ......... 701/400, 411, 412, 413, 414, 416, 418, 701/425, 426
See application file for complete search history.

(56) References Cited

U.S. PATENT DOCUMENTS

| | | | |
|---|---|---|---|
| 8,160,532 B2* | 4/2012 | Vishwanathan et al. | 455/310 |
| 2002/0120395 A1 | 8/2002 | Smith | |
| 2004/0054428 A1* | 3/2004 | Sheha et al. | 700/56 |
| 2007/0032945 A1* | 2/2007 | Kaufman | 701/208 |
| 2008/0036778 A1* | 2/2008 | Sheha et al. | 345/502 |
| 2008/0162037 A1 | 7/2008 | Mahmoud | |
| 2009/0254840 A1 | 10/2009 | Churchill et al. | |
| 2011/0282826 A1* | 11/2011 | Schwendimann et al. | 706/54 |
| 2011/0283218 A1* | 11/2011 | Schwendimann et al. | 715/772 |

* cited by examiner

*Primary Examiner* — Khoi Tran
*Assistant Examiner* — Adam Mott
(74) *Attorney, Agent, or Firm* — Parks IP Law LLC; Mickki D. Murray, Esq.

(57) ABSTRACT

Map information is exchanged between communication devices. A map of a geographical area is received. The map includes embedded interactive links that graphically represent points of interest within the geographical area. An embedded interactive link that graphically represents at least one point of interest is highlighted within the map. Responsive to selection of another embedded interactive link within the map that graphically represents another point of interest within the geographical area, the other embedded link within the map is highlighted. The map is transmitted, with the other embedded interactive link that graphically represents the other point of interest highlighted.

20 Claims, 7 Drawing Sheets

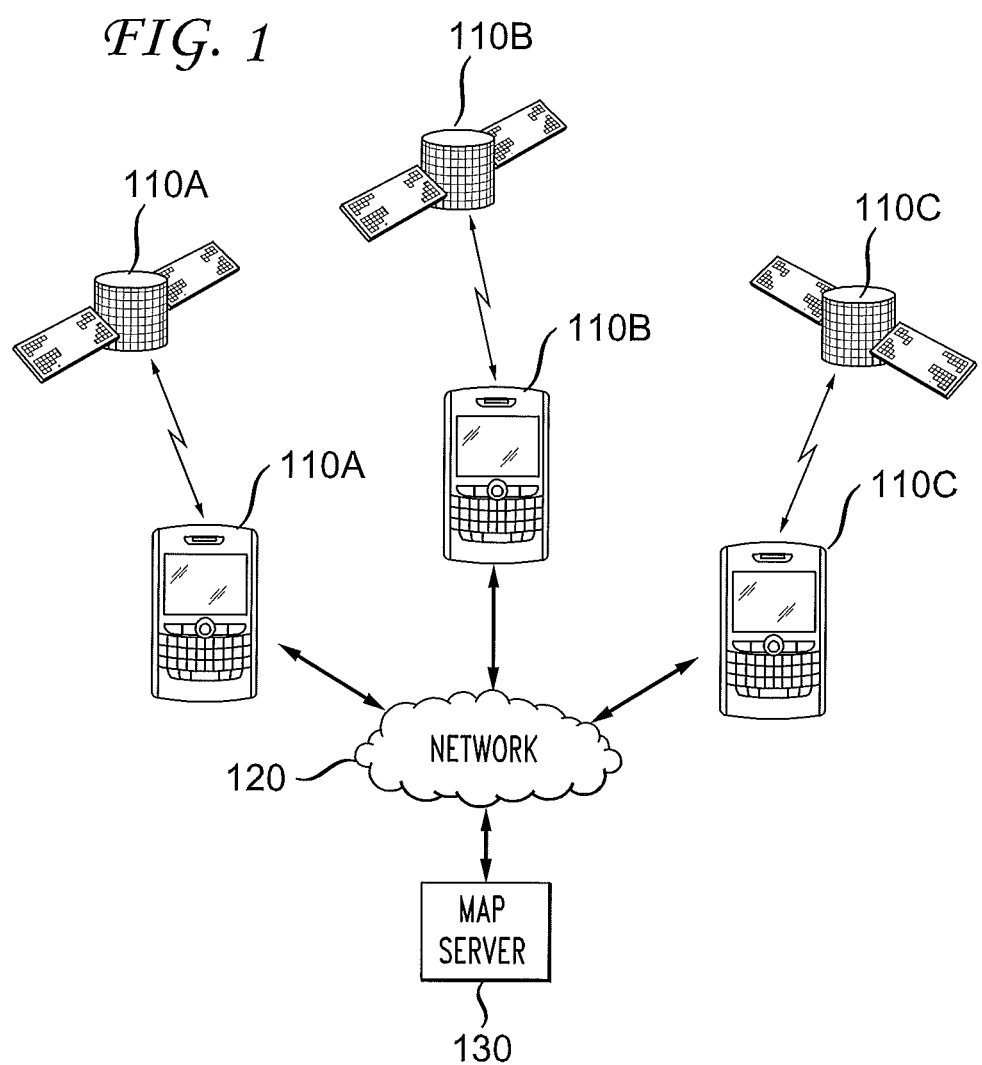

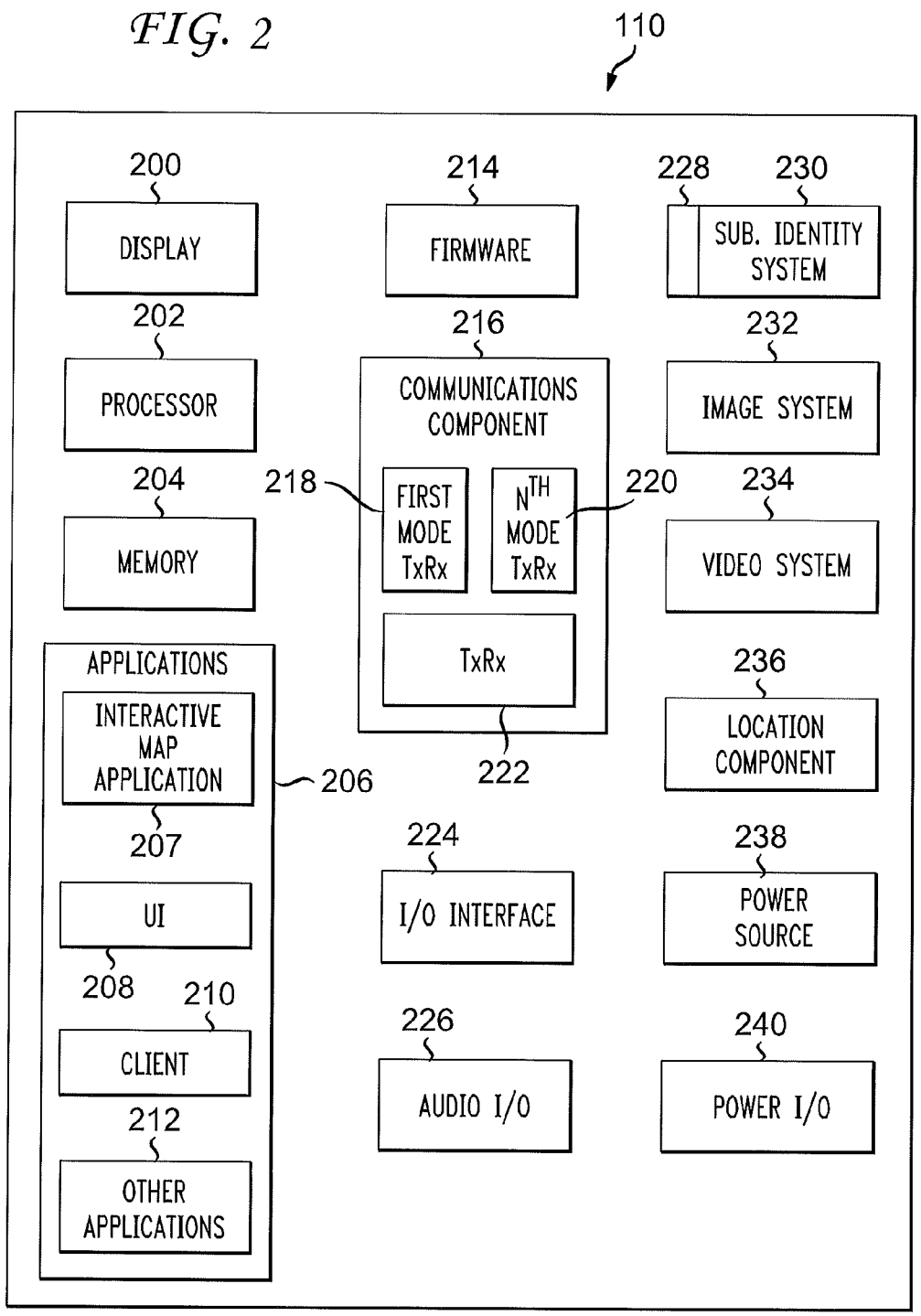

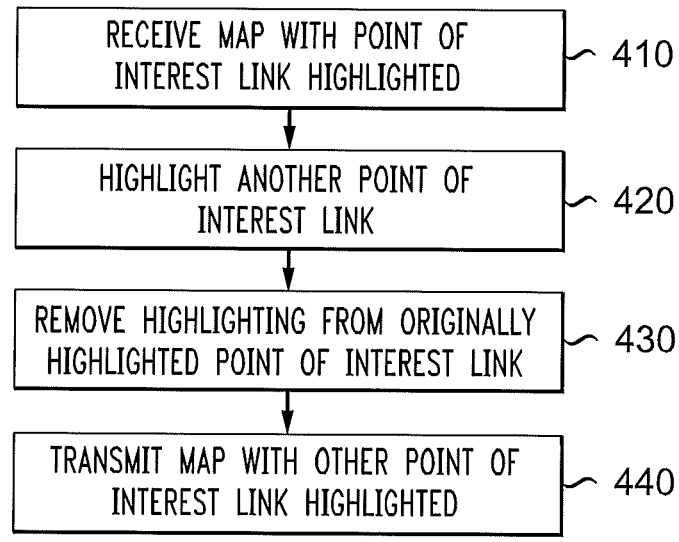
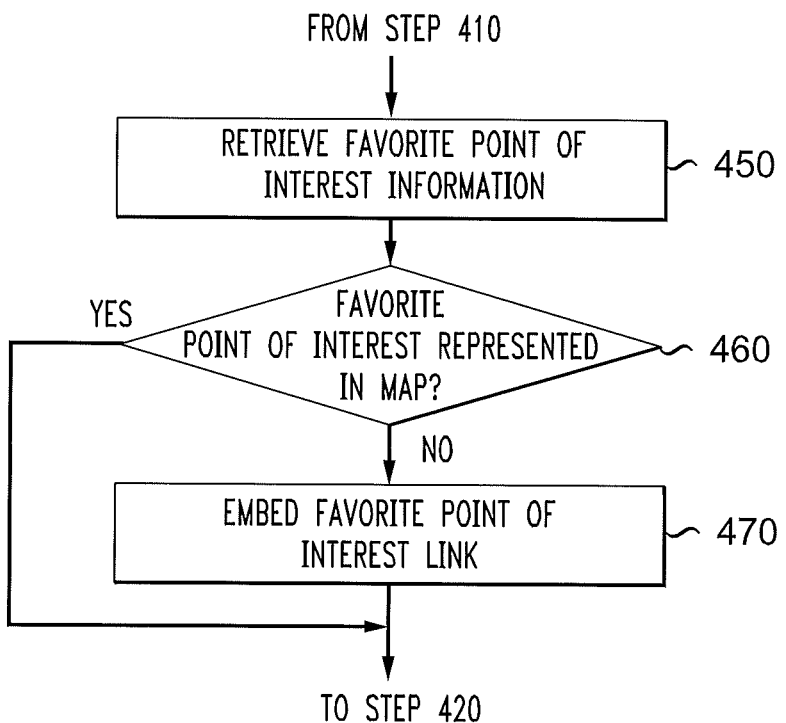

METHODS, DEVICES, AND COMPUTER PROGRAM PRODUCTS FOR EXCHANGING INTERACTIVE MAP INFORMATION

TECHNICAL FIELD

The present disclosure relates generally to telecommunications, and, more particularly, to exchanging map information between communication devices.

BACKGROUND

Cell phones and other communication devices are being deployed that provide map information. Currently, users can look up businessnesses or addresses using a mobile communication device and be presented with a map and/or directions. Users may share such maps and directions with each other via their communication devices.

However, maps currently exchanged in such a manner are static in the sense that they do not permit users to alter the maps and exchange the altered maps. Also, current maps are limited in the information they include.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to one embodiment, a method is provided for exchanging map information between a first communication device and at least a second communication device. A map of a geographical area is received at the second communication device from the first communication device. The map includes embedded interactive links that graphically represent points of interest within the geographical area. An embedded interactive link that graphically represents at least one point of interest is highlighted within the map. Responsive to selection of another embedded interactive link within the map that graphically represents another point of interest within the geographical area, the other embedded link within the map is highlighted. The map is transmitted from the second communication device to the first communication device, with the other embedded interactive link that graphically represents the other point of interest highlighted.

According to another embodiment a device for exchanging map information includes an interface for receiving a map of a geographical area. The map includes embedded interactive links that graphically represent points of interest within the geographical area. An embedded interactive link that graphically represents at least one point of interest is highlighted within the map. The map further includes a processor for highlighting another embedded interactive link within the map that graphically represents another point of interest within the geographic area responsive to selection of the other embedded interactive link within the map. The map is transmitted, via the interface, with the other embedded interactive link that graphically represents the other point of interest highlighted.

According to another embodiment, a non-transitory computer program product includes a storage medium upon which instructions are recorded that, when executed by a processor, perform a method for exchanging map information. The method includes receiving a map of a geographical area. The map includes embedded interactive links that graphically represent points of interest within the geographical area. An interactive link that graphically represents at least one point of interest is highlighted within the map. The method further includes highlighting another embedded link within the map that graphically represents another point of interest within the geographic area responsive to selection of the other embedded interactive link within the map. The map is transmitted, with the other embedded interactive link that graphically represents the other point of interest highlighted.

BRIEF DESCRIPTION OF THE DRAWINGS

FIG. 1 illustrates a system for exchanging interactive map information according to an exemplary embodiment.

FIG. 2 illustrates a device for exchanging interactive map information according to an exemplary embodiment.

FIGS. 4A and 4B illustrate methods for exchanging interactive map information according to an exemplary embodiment.

DETAILED DESCRIPTION

Figure 3A:
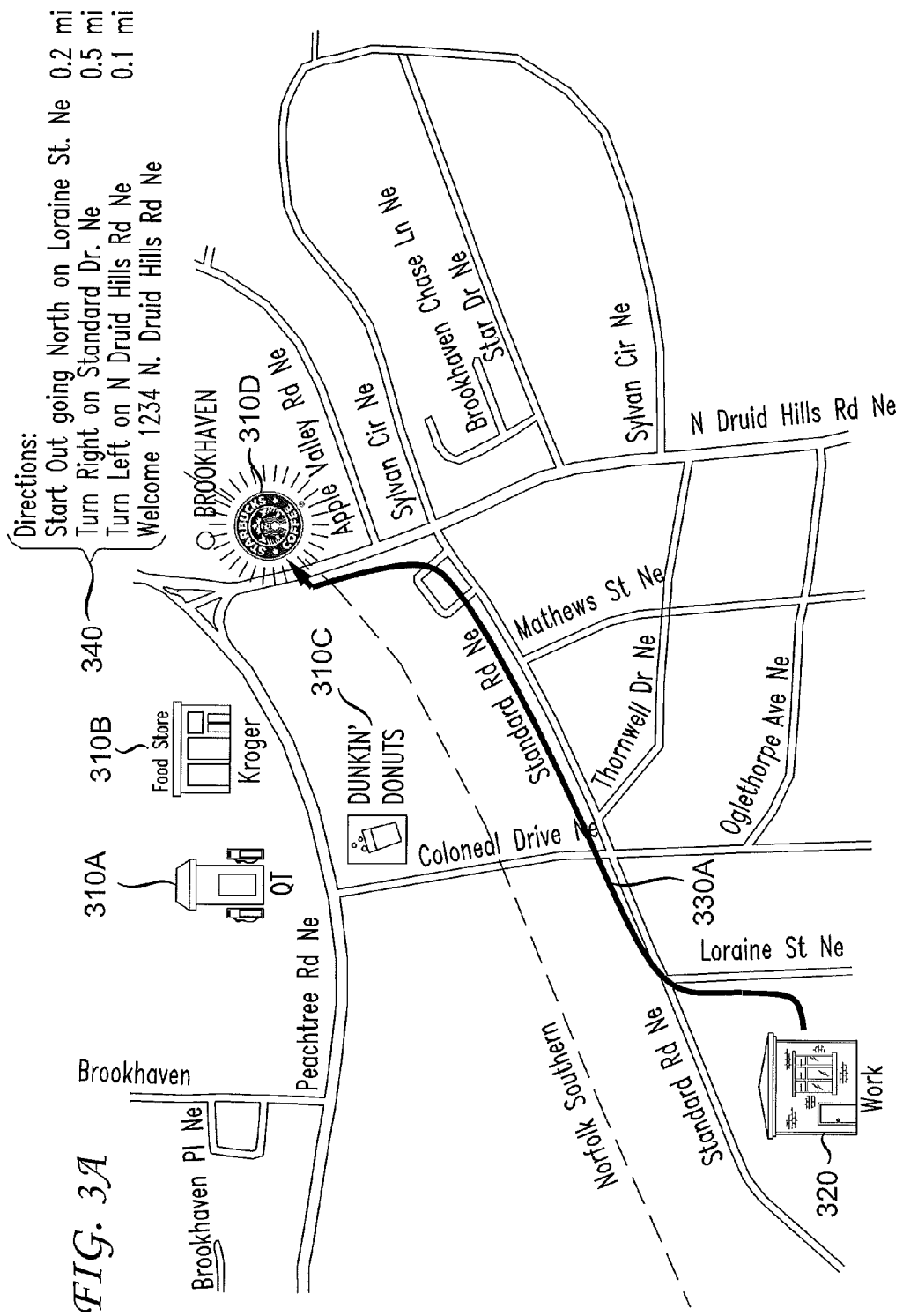
FIGS. 3A-3C illustrate exemplary interactive maps, including points of interest highlighted, according to an exemplary embodiment.

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

FIG. 1 illustrates an exemplary system for exchanging interactive map information according to an exemplary embodiment. In the system shown in FIG. 1, communication devices 110A, 110B, and 110C communicate with devices, e.g., GPS satellites, 105A, 105B, and 105C, respectively, to obtain location information. It should be appreciated that other location systems may be used to provide location information the communication devices, such as cellular triangulation systems and the like.

According to an exemplary embodiment, one or more of the communication devices 110A, 110B, and 110C communicate location information indicating location information to a map server 130 via a network 120. The location information may indicate a current location of a communication device at a given time. Alternatively, the location information may indicate any other location selected by a communication device, e.g., a location about which a user of a communication device desires information.

The map server 130, in turn, provides a map with embedded links graphically representing points of interest within the geographical area of the location indicated by one or more of the devices requesting the map. Once a map is obtained from the map server 130, the communication devices 110A, 110B, and 110C exchange map information with each other via the network 120, interactively highlighting embedded links to points of interest within the map, removing highlight from links within the map, generating routes to various points of interest, embedding links additional points of interests and including routes to such points within the map, etc. In this manner, the users of the communication devices 110A, 110B, and 110C may exchange interactive information for planning a trip, scheduling a meeting, etc.

The communication devices 110A, 110B, and 110C may be implemented with mobile communication devices, such as the device 110 described in detail below with reference to FIG. 2. Alternatively, one or more of the communication devices 110A, 110B, and 110C may be implemented with a personal computing device. Although three communication devices 110A, 110B, and 110C are shown in FIG. 1 for illustrative purposes, it should be appreciated that any number of communication devices may exchange interactive map information in the manner set forth in this disclosure. Moreover, although three GPS satellites 105A, 105B, and 105C are illustrated, any number of location devices may be used.

The map server 130 may be implemented with a device such as the device 500 described in further detail below with reference to FIG. 5. The network 120 may be implemented with one or more wireless networks that use exemplary telecommunications standards, such as Global System for Mobile communications (GSM) and Universal Mobile Telecommunications Systems (UMTS). It should be understood, however, that the embodiments may be implemented in wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and grater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

FIG. 2 illustrates a schematic block diagram of an exemplary device 110 according to exemplary embodiments. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software. The term "application", or variants thereof, s used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like.

Referring to FIG. 2, a device 110 may be a multimode handset and can include a variety of computer-readable media, including volatile media, non-volatile media, removable media, and non-removable media. The term "computer-readable media" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the device 110.

The device 110 may include a display 200 for displaying multimedia, such as, for example, text, images, video, telephone functions, such as Caller ID data, setup functions, menus, music metadata, messages, wallpaper, graphics, Internet content, device status, preference settings, and the like.

According to exemplary embodiment, the display 200 may display interactive maps with embedded links graphically representing points of interest. One or more of the embedded links may be highlighted upon selection by a user. The display may also show one or more routes to one or more selected points of interest, and a selected route may be highlighted. The display 200 may be an interactive touch screen or a screen that may be manipulated with a cursor, e.g., for selecting links of interested embedded within a map. The display 200 may also display information related to the interactive map, e.g., directions to selected points of interest from a starting location within the geographical area represented by the map.

The device 110 may include a processor 202 for controlling and/or processing data. A memory 204 can interface with the processor 202 for the storage of data and/or applications 206.

The applications 206 may include, for example, SMS messaging software, EMS message software, MMS messaging software, USSD software, a WAP browser, and the like.

Also, according to an exemplary embodiment, the applications 206 may include an interactive map application 207 for use in highlighting points of interest in a map responsive to selection of points of interest in the map, generating routes to points of interest from a particular location and including the routes in the map, highlighting the generated routes, determining whether favorite points of interest are included in the map and embedding links to favorite points of interest in the map as appropriate, generating routes to the favorite points of interest and including the routes to the favorite points of interest in the map, highlighting the embedded links to the favorite points of interest and the respective routes, etc.

The applications 206 may also include a user interface (UI) application 208. The UI application 208 can interact with a client 210 (e.g., an operating system) to facilitate user interaction with device functionality and data, for example, entering message content, viewing received messages, answering/initiating calls, entering/deleting data, password entry and settings, configuring settings, address book manipulation, and the like. Such user interaction may be facilitated via, e.g., a keypad or a touchscreen included in the device 110 or communicating with the device via the I/O interface 224. Also, according to exemplary embodiments, the UI application 208 can be used for interacting with a map displayed on the display 200, e.g., to select embedded links to points of interest. For example, for a map represented in a JPEG format, a link and/or a route may be highlighted by turning a bit corresponding to a selected area within the display on, and highlighting may be removed by turning the bit off.

The applications 206 may include other applications 212, such as, for example, add-ons, plug-ins, email applications, music application, video applications, camera applications, location-based service (LSB) applications, power conservation applications, game applications, productivity application, entertainment applications, combinations thereof, and the like, as well as subsystem and/or components.

The applications 206 can be stored in the memory and/or in firmware components 214 and can be executed by the processor 202. The firmware 214 can also store code for execution during initialization of the device 110.

A communications component 216 may interface with the processor 202 to facilitate wired/wireless communication with external systems including, for example, cellular networks, location systems, VoIP networks, local area networks (LAN's), wide area networks (WAN's), metropolitan are networks (MAN's), personal area networks (PAN's), and other networks, which may be implemented using WIFI, WIMAX, combinations and improvements thereof, and the like. The communications component 216 can also include a multi-mode communication subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers may be included. The communications component 216 may also include a transceiver 222 for other communication technologies, such as, for example, WIFI, WIMAX, BLUETOOTH, infrared, IRDA, NFC, RF, and the like. The communications components 216 may also facilitate reception from terrestrial radio networks, digital satellite radio networks, Internet based radio service networks, combinations thereof, and the like. The communications component 216 can process data from a network, such as, for example, the network 120, the Internet, a corporate network, a home broadband network, a WIFI hotspot, and the like via an ISP, DSL provider, or broadband provider. The communications component 216 can be used to receive maps with embedded links and transmit maps with embedded links from and to other communication devices via the network 120. Also, the communications component 216 may be used to receive a map from a map server 130 via the network, upon an initial query.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device and a network or local device instead of, or in addition to, the communications component 216.

Audio capabilities may be provided by an audio I/O component 226 that may include a speaker for the output of audio signals and a microphone to collect audio signals. The device 110 can include a slot interface 228 for accommodating a subscriber identity system 230 such as, for example, a subscriber identity module (SIM) or universal SIM (USIM). The subscriber identity system 230 instead can be manufactured into the device 110, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

According to an exemplary embodiment, the subscriber identity system 230 may include favorite points of interest associated with various geographical areas. Alternatively, the favorite points of interest may be stored in the memory 204. The favorite points of interest associated with a particular geographical area may be retrieved, e.g., by the interactive map location 207 executed by the processor 202, when a map of the particular geographical area is received. Links graphically representing the favorite points of interest may be automatically embedded within the map, or the links may be embedded upon selection and/or confirmation by a user via a suitable input, e.g., a touchscreen or a keyboard.

The device 110 can further include an image capture and processing system 232 (image system). Photos and/or videos can be obtained via an associated image capture subsystem of the image system 232, for example, a camera. The device 110 may also included a video system 234 for capturing, processing, recording, modifying, and or transmitting video content.

A location component 236 may be included to send and/or receive signals such as, for example, GPS data, A-GPS data, WIF/WIMAX and or cellular network triangulation data, combinations thereof, and the like. The location component 236 can interface with cellular network nodes, telephone lines, satellites, such as satellites 105A, 105B, and 105C, location transmitters and/or beacons, wireless network transmitters and receivers, for example, WIFI hotspots, radio transmitters, combinations thereof and the like. The device 110 may obtain, generate, and/or receive data to identify its location or can transmit data used by other devices to determine the device 110 location. The location of the device 110 can be provided to the map server 130 and used by the map server to provide a map of the geographical area in which the device 110 is located at a given time.

The device 110 may also include a power source 238, such as batteries and/or other power subsystems (AC or DC). The power source 238 can interface with an exemplary power system or charging equipment via a power I/O component 240.

Figure 3B:
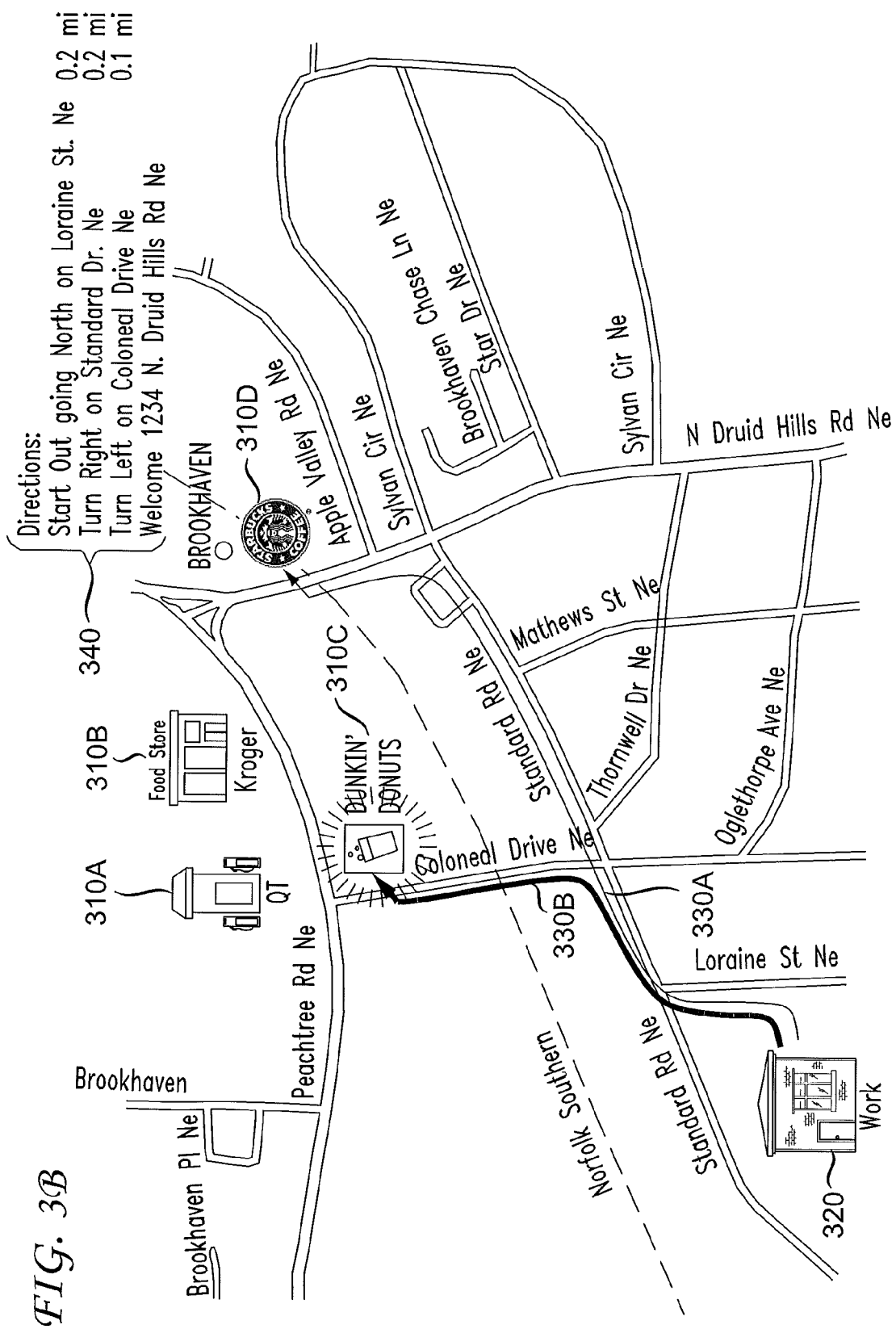
Figure 3C:
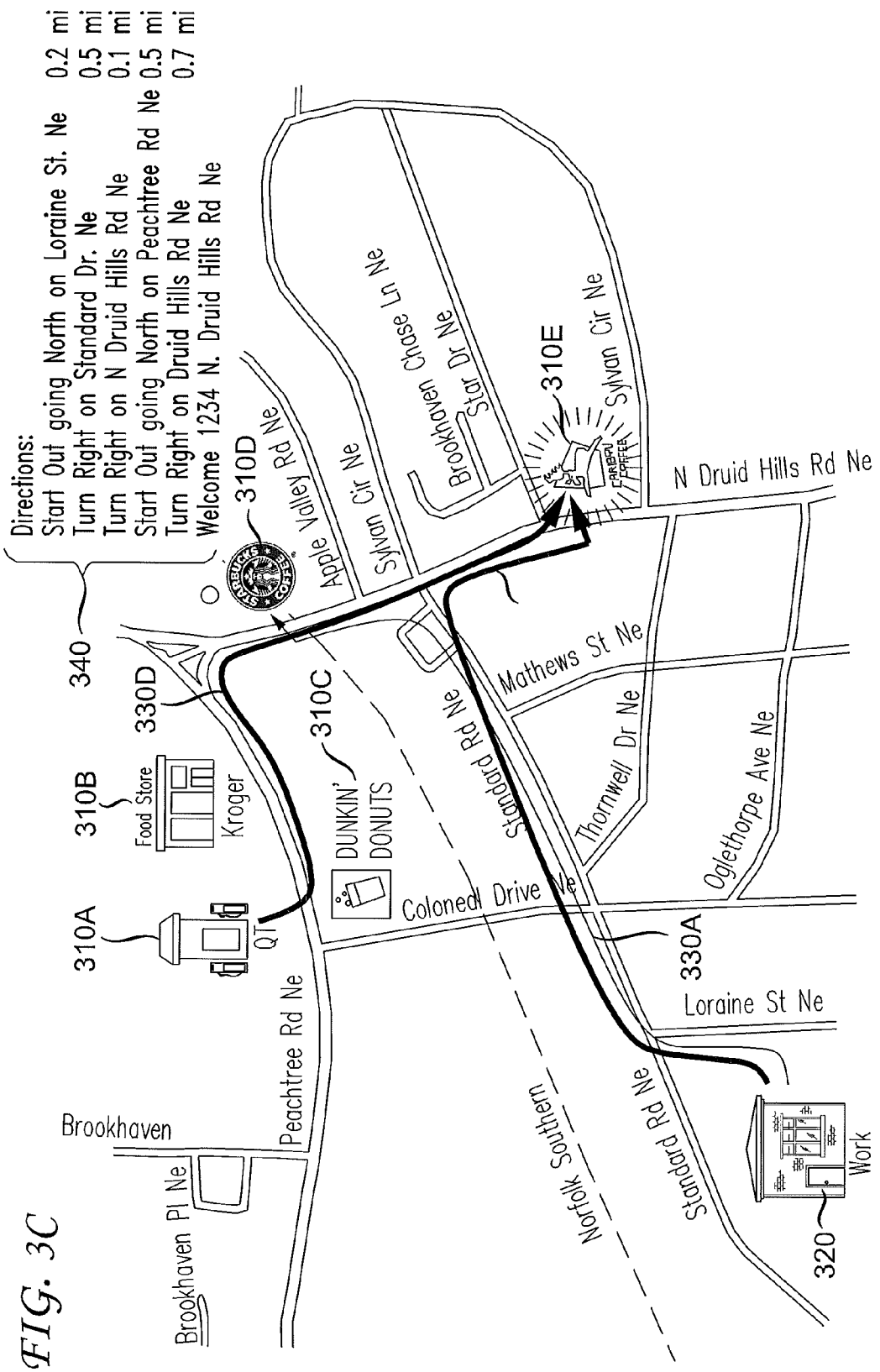

FIGS. 3A-3C illustrate interactive map information exchanged between communication devices according to an exemplary embodiment. The interactive map information may be used to plan a trip, set up a meeting, etc.

FIG. 3A illustrates an example of a map including embedded interactive links that may be displayed on a communication device. The map may be obtained from the map server 130 upon an initial query from a communication device, e.g., the communication device 110A. The map, which may be displayed, e.g., on a display 200 of the communication device 110A, may include several embedded links 310A, 310B, 310C, and 310D that graphically represent points of interest within the geographical area represented in the map. In this example, the points of interest represented by the links 310A, 310B, 310C, and 310D include a gas station, a grocery store, a doughnut shop, and a coffee shop, respectively. One or more of the embedded links, e.g., link 310D, may be highlighted upon selection by a user. The user may select the link to highlight via a touchscreen display or another suitable input on the communication device 110A. A starting location, e.g., a work location, may also be represented on the map by an embedded link 320. The starting location may be selected by the user of the communication device via the touchscreen display or other suitable input. Upon selection of the link 320 and the link 310D by a user, a graphically represented route 330A from the selected start location to the selected location of interest may be generated and included in the map. The route 330A may be highlighted, along with the link 310D. Directions from the selected start location may also be generated and displayed, e.g., as text 340, adjacent to the map.

Upon receipt of a map such as that shown in FIG. 3A from a device, such as communication device 110A, another communication device, such as communication device 110B, may alter the map as shown in FIG. 3B. Referring to FIG. 3B, the map includes the embedded links 310A, 310B, 310C, and 310D graphically representing the points of interests. However, the map shown in FIG. 3B reflects a selection by the user of a device, e.g., the communication device 110B, of an embedded link 310C to an alternative point of interest. Upon selection of the link 310C, a route 330B from the selected start location 320 is generated and included in the map. The highlighting may be removed from the link 310D and the route 330A. Thus, the link 310C and the route 330B may be highlighted instead of the link 310D and the route 330A. However, the link 310D and the route 330A may remain in the map, as shown in FIG. 3B.

FIG. 3C illustrates an example of the map shown in FIG. 3A, altered in a different manner by a user of a communication device, e.g., the communication device 110C. The map includes the embedded links 310A, 310B, 310C, and 310D. However, in this map, an additional link 310E graphically representing yet another point of interest, e.g., a different coffee shop, is embedded in the map. This additional link may be generated based on a favorite points of interest stored in the communication device 110C, e.g., in the memory 204 or in the subscriber identity system 230. Upon selection of the link 310E via a suitable input, a route 330C from the start location, represented by the link 320, to the favorite point of interest, represented by the link 310E, is generated and included in the map. The highlighting may be removed from the link 310D and the route 330A, and the link 310E and the route 330C may be highlighted instead. However, the route 330A and the link 310D may remain in the map.

Instead of using the same start location 320, users of either of the communication devices 110B and 110C receiving the map from the communication device 110A may decide to use additional start locations. Thus, using the scenario depicted in FIG. 3C as an example, upon selection of the link 310E and a selection of the link 310A as a start location, another route 330D may be generated from the start location represented by the link 310A to the favorite point of interest, represented by the link 310E. The route 330D may be highlighted and included in the map, along with the highlighted route 330C as shown in FIG. 3C. As an alternative, the start location represented by the link 310E may be selected as alternate start location instead of the start location represented by the link 310A, such that only the route 330D would appear highlighted within the map. According to an exemplary embodiment, if no other start location is selected, the originally selected start location may be used as the default start location.

The map shown in FIG. 3A is an example of a map that may be transmitted from a communication device, e.g., device 110A, to one or more devices, e.g., devices 110B and 110C. This map may be transmitted to suggest a meeting place for users of the devices 110A, 110B, and 110C. The maps shown in FIGS. 3B and 3C are examples of maps altered by devices, e.g., devices 110B and 110C, respectively, that may be transmitted back to the original device, e.g., device 110A, e.g., to suggest alternate meeting places. The devices 110A, 110B, and 110C may alter information included in the maps and exchange the maps as desired, e.g., until a meeting place is agreed upon.

FIGS. 4A and 4B illustrate methods for exchanging interactive map information according to an exemplary embodiment. Referring to FIG. 4A, an interactive map with an embedded point of interest link highlighted is received at step 410 at one or more communication devices, e.g., devices 110B and 110C, from a communication device, e.g., communication device 110A. The map with embedded links to points of interest may be obtained by the communication device 110A from the map server 130, and a user of the communication device 110A may select a point of interest link to highlight, as described above. At step 420, one or more of the communication devices receiving the map, e.g., communication device 110B, highlights another embedded point of interest link on the map responsive to user input. Highlighting is removed from the originally highlighted point of interest link at step 430 by the device 110B. At step 440, the communication device 110B then transmits the map with the other point of interest link highlighted to the communication device that originally transmitted the map, e.g., device 110A, and to the other communication device that originally received the map, device 110C.

In addition to selecting a point of interest embedded in a received map, a communication device receiving the map, e.g., device 110C, may query a favorite points of interest database stored within the device and retrieve favorite points of interest in the geographical area represented by the map at step 450. This step may be performed, e.g., after step 410. At step 460, the communication device 110C may determine whether any of the favorite points of interest are represented on the map. If not, a link graphically representing the favorite point of interest may be embedded in the map at step 470. From steps 470 and 460, the method may return to step 420, and the favorite point of internet link may be highlighted in the map and sent to the devices 110A and 110B in a manner similar to that described above.

Figure 5:
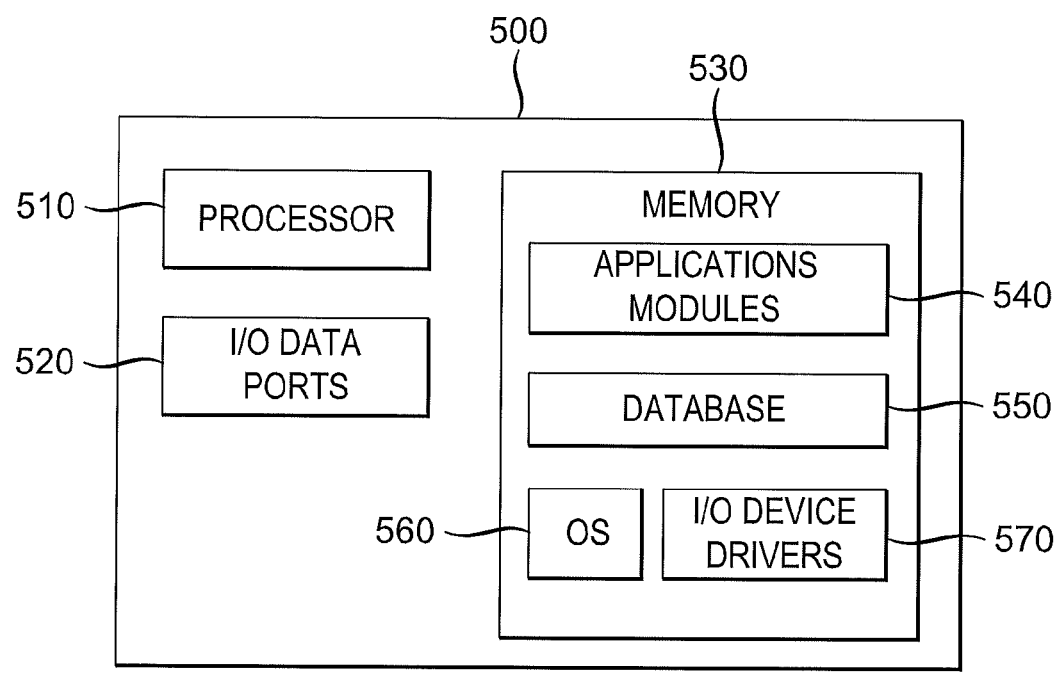
FIG. 5 is an exemplary block diagram of a device for providing a map of a geographical area.

FIG. 5 is a block diagram of a device 500, such as the map server 130, for providing a map of a geographical area based on a query from a device, e.g., communication devices 110A, 110B, and 110C. The device 500 includes a processor 510 that receives information, such as location indicating information and requests for maps from communication devices 110A, 110B, and 110C via I/O Data Ports 520. The I/O Data Ports 520 can be implemented with, e.g., an interface including an antenna or other suitable type of transceiver through which data and signals may be transmitted and received. It should be appreciated that the I/O Data Ports 520 can be used for communications with the communication devices 110A, 110B, and 110C via the communication network 120.

The processor 510 communicates with the memory 530 via, e.g., an address/data bus. The processor 510 can be any commercially available or customer microprocessor. The memory is 530 is representative of the overall hierarchy of memory devices containing the software and data used to implement the functionality of the device 500. The memory 530 can include but is not limited to the following types of devices: processor registers, processor cache, RAM, ROM, PROM, EPROM, EEPROM, flash memory, SRAMD, DRAM other volatile memory forms, and non-volatile, semi-permanent or permanent memory types; for example, tape-based media, optical media, solid state media, hard disks, combinations thereof, and the like.

As shown in FIG. 5, the memory 530 may include several categories of software and data used in the device 500, including, applications 540, a database 550, an operating system (OS) 560, and the input/output (I/O) device drivers 570. As will be appreciated by those skilled in the art, the OS 560 may be any operating system for use with a data processing system. The I/O device drivers 570 may include various routines accessed through the OS 560 by the application modules 540 to communicate with devices, and certain memory components. The application modules 540 can be stored in the memory 530 and/or in a firmware (not shown) as executable instructions, and can be executed by the processor 510. The application modules 540 include various programs that, when executed by the processor 510, implement the various features of the device 500, including applications to apply to data stored in the database 550, along with data received vi the I/O ports 520. The application modules may generate a map of a geographical area represented by location information provided by the communication devices 110A, 110B, and 110C. The map may include embedded interactive links graphically representing points of interest within the geographical area. Once map is retrieved from the device 500 by one of the communication devices 110A, 110B, and 110C, the map may be exchanged and altered without querying the device 500.

The database 550 represents the static and dynamic data used by the applications 540, the OS 560, the I/O device drivers 570 and other software programs that may reside in the memory. The database 550 may include, for example, maps of various geographical areas which may be updated as appropriate.

While the memory 530 is illustrated as residing proximate the processor 510, it should be understood that at least a portion of the memory 530 can be a remotely accessed storage system, for example, a server on a communication network, a remote hard disk drive, a removable storage medium, combinations thereof, and the like. Thus, any of the data, application modules, and/or software described above can be stored within the memory 530 and/or accessed via network connections to other data processing systems (not shown) that may include a local area network (LAN), a metropolitan area network (MAN), or a wide area network (WAN), for example.

It should be understood that FIG. 5 and the description above are intended to provide a brief, general description of a suitable environment in which the various aspects of some embodiments of the present disclosure can be implemented. As indicated above with reference to FIG. 2, while this description refers to computer-readable instructions, the present disclosure also can be implemented in combination with other program modules and/or as a combination of hardware and software in addition to, or instead of, computer readable instructions.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, for exchanging map information between a first communication device and a second communication device, comprising:
   receiving, by the second communication device, from the first communication device, a map of a geographical area, wherein:
      the map comprises a plurality of embedded interactive links representing graphically a corresponding plurality of points of interest within the geographical area; and
      a first embedded interactive link, of the plurality of embedded interactive links, represents a first point of interest, of the plurality of points of interest, and is highlighted within the map;
   retrieving information representing a second point of interest within the geographical area represented on the map;
   determining whether the plurality of embedded interactive links includes embedded within the map a second interactive link corresponding to the second point of interest;
   embedding, responsive to determining that there is no second interactive link embedded within the map, a second interactive link into the map, yielding a second embedded interactive link;
   highlighting, by the second communication device, within the map, the second embedded interactive link; and
   transmitting, by the second communication device, to the first communication device, the map having highlighted therein the second embedded interactive link.

2. The method of claim 1, further comprising:
   removing, within the map, the highlighting from the first embedded interactive link representing the first point of interest;
   wherein transmitting the map comprises transmitting the map having highlighted therein the second embedded interactive link instead of the first embedded interactive link.

3. The method of claim 1, wherein the map received further comprises highlighted graphical information indicating a first route to the first point of interest from a location.

4. The method of claim 3, further comprising:
   generating graphical information indicating a second route from the location to the second point of interest;
   including, within the map, the graphical information indicating the second route; and
   highlighting, within the map, the graphical information indicating the second route.

5. The method of claim 4, further comprising removing highlighting from the graphical information representing the first route.

6. The method of claim 1, wherein retrieving information representing the second point of interest within the geographical area represented on the map received comprises retrieving the second point of interest from a point-of-interest database of the second communication device.

7. The method of claim 6, further comprising:
   generating graphical information indicating a route from a location to the second point of interest; and
   including, within the map, the graphical information indicating the route to the second point of interest from the location.

8. A system, comprising:
   an interface;
   a processor; and
   a computer-readable storage medium comprising instructions that, when executed by the processor, cause the processor to perform operations, for exchanging map information, comprising:
      receiving, from the interface, a map of a geographical area, wherein:
         the map comprises a plurality of embedded interactive links representing graphically a corresponding plurality of points of interest within the geographical area; and
         a first embedded interactive link, of the plurality of embedded interactive links, represents graphically a first point of interest, of the plurality of points of interest, and is highlighted within the map;
      retrieving information representing a second point of interest within the geographical area represented on the map;

determining whether the plurality of embedded interactive links includes embedded within the map a second interactive link corresponding to the second point of interest;

embedding, responsive to determining that there is no second interactive link embedded within the map, a second interactive link into the map, yielding a second embedded interactive link;

highlighting, within the map, the second embedded interactive link; and transmitting, for receipt by a communication device, the map having highlighted therein the second embedded interactive link.

9. The system of claim 8, wherein:

the operations further comprise removing, within the map, highlighting from the first embedded interactive link representing the first point of interest; and transmitting the map comprises transmitting the map having highlighted the second point of interest instead of the first point of interest.

10. The system of claim 8, wherein the map received further comprises highlighted graphical information indicating a first route to the first point of interest from a location.

11. The system of claim 10, wherein the operations further comprise:

generating graphical information indicating a second route to the other second point of interest from the location, within the map; and highlighting, within the map, the graphical information indicating the second route.

12. The system of claim 11, wherein the operations further comprise removing highlighting from the graphical information representing the first route.

13. The system of claim 8, wherein the operation of retrieving the information comprises retrieving the information from a point-of-interest database in communication with the processor.

14. The system of claim 13, wherein the operations further comprise generating graphical information indicating a route to the second point of interest from a location and comprises the graphical information indicating the route to the second point of interest from the location within the map.

15. A computer-readable storage device comprising instructions that, when executed by a processor, cause the processor to perform operations, for exchanging map information, comprising:

receiving a map of a geographical area, wherein:

the map comprises embedded interactive links representing graphically points of interest within the geographical area; and a first embedded interactive link, of the plurality of embedded interactive links, represents graphically a first point of interest, of a corresponding plurality of points of interest, and is highlighted within the map;

retrieving information representing a second point of interest within the geographical area represented on the map;

determining whether the plurality of embedded interactive links includes embedded within the map a second interactive link corresponding to the second point of interest;

embedding, responsive to determining that there is no second interactive link embedded within the map, a second interactive link into the map, yielding a second embedded interactive link;

highlighting the second embedded interactive link within the map; and transmitting, for receipt by a communication device, the map having highlighted therein the second embedded interactive link.

16. The computer-readable storage device of claim 15, wherein:

the operations further comprise removing, within the map, highlighting from the first embedded interactive link; and the operation of transmitting the map comprises transmitting the map having the second point of interest highlighted instead of the first point of interest.

17. The computer-readable storage device of claim 15, wherein the map received further comprises highlighted graphical information indicating a route to the first point of interest from a location.

18. The computer-readable storage device of claim 17, wherein the operations further comprise:

generating graphical information indicating a second route to the second point of interest from the location; and including, within the map, the graphical information indicating the second route.

19. The computer-readable storage device of claim 15, wherein the operation of retrieving information representing the second point of interest comprises retrieving the information from a point-of interest database in communication with the processor.

20. The computer-readable storage device of claim 19, wherein the operations further comprise:

generating graphical information indicating a route to the second point of interest from a location; and including within the map the graphical information indicating the route to the second point of interest from the location.

* * * * *